United States Patent
Kumoi et al.

(10) Patent No.: US 10,322,458 B2
(45) Date of Patent: Jun. 18, 2019

(54) CUTTING INSERT HAVING BOTTOM SURFACE WITH INCLINED PARTS AND INDEXABLE ROTARY CUTTING TOOL

(71) Applicant: TUNGALOY CORPORATION, Iwaki-shi, Fukushima (JP)

(72) Inventors: Haruki Kumoi, Iwaki (JP); Ryuichi Saji, Iwaki (JP)

(73) Assignee: TUNGALOY CORPORATION, Iwaki-shi, Fukushima (JP)

(*) Notice: Subject to any disclaimer, the term of this patent is extended or adjusted under 35 U.S.C. 154(b) by 124 days.

(21) Appl. No.: 15/324,823

(22) PCT Filed: Nov. 26, 2015

(86) PCT No.: PCT/JP2015/083211
§ 371 (c)(1),
(2) Date: Jan. 9, 2017

(87) PCT Pub. No.: WO2016/084891
PCT Pub. Date: Jun. 2, 2016

(65) Prior Publication Data
US 2017/0197259 A1    Jul. 13, 2017

(30) Foreign Application Priority Data
Nov. 27, 2014 (JP) .................. 2014-239407

(51) Int. Cl.
*B23C 5/20* (2006.01)
*B23C 5/10* (2006.01)
*B23C 5/22* (2006.01)

(52) U.S. Cl.
CPC .............. *B23C 5/207* (2013.01); *B23C 5/109* (2013.01); *B23C 5/2221* (2013.01);
(Continued)

(58) Field of Classification Search
CPC ............ B23C 2200/0416; B23C 5/109; B23C 2200/161; B23C 2210/168; B23C 5/207;
(Continued)

(56) References Cited

U.S. PATENT DOCUMENTS 4,294,565 A * 10/1981 Erkfritz .................. B23C 5/207
                                                              407/113
5,542,795 A * 8/1996 Mitchell ............... B23C 5/2221
                                                              407/35
(Continued)

FOREIGN PATENT DOCUMENTS

| WO | 2009083952 A1 | 7/2009 | |
|---|---|---|---|
| WO | WO 2013/039090 | 3/2013 | |
| WO | WO 2014104667 A1 * | 7/2014 | ............... B23C 5/06 |

OTHER PUBLICATIONS

International Search Report dated Feb. 9, 2016 issued in counterpart International (PCT) Application (No. PCT/JP2015/083211).
(Continued)

*Primary Examiner* — Sara Addisu
(74) *Attorney, Agent, or Firm* — Studebaker & Brackett PC

(57) ABSTRACT

A cutting insert has a first (top) end surface, a second (bottom) end surface, a peripheral side surface connecting the top and bottom end surfaces, and a mounting hole having a central axis O which penetrates the top and bottom end surfaces. Cutting edges are formed on an intersecting edge between the first end surface and the peripheral side surface. The second end surface has an inclined part. When a virtual plane substantially perpendicular to the axis O and passing through any point of the cutting edges is defined, the inclined part is inclined so as to be more distant from the virtual plane, heading from the peripheral side surface to the axis O. A projected part projected in a direction along the axis O is formed in an area around the mounting hole in the
(Continued)

inclined part. This reinforces the strength of the mounting hole.

11 Claims, 14 Drawing Sheets

(52) U.S. Cl.
CPC .................. *B23C 2200/0416* (2013.01); *B23C 2200/0494* (2013.01); *B23C 2200/161* (2013.01); *B23C 2200/164* (2013.01); *B23C 2200/168* (2013.01); *B23C 2210/168* (2013.01)

(58) Field of Classification Search
CPC .......... B23C 5/2221; B23C 2200/0494; B23C 2200/164; B23C 2200/168
See application file for complete search history.

(56) References Cited

U.S. PATENT DOCUMENTS

| | | | | |
|---|---|---|---|---|
| 5,720,583 | A * | 2/1998 | Bohnet | B23C 5/202 407/113 |
| 5,755,536 | A * | 5/1998 | Vollmer | B23B 27/145 407/113 |
| 5,931,613 | A * | 8/1999 | Larsson | B23B 27/08 407/103 |
| 5,944,456 | A | 8/1999 | Shirley et al. | |
| 6,116,824 | A | 9/2000 | Strand et al. | |
| 7,121,771 | B2 * | 10/2006 | Englund | B23B 27/1622 407/103 |
| 7,217,070 | B2 * | 5/2007 | Hecht | B23B 27/141 407/113 |
| 9,120,156 | B2 * | 9/2015 | Hecht | B23B 27/145 |
| 2002/0002886 | A1 * | 1/2002 | Hansson | B23B 27/04 82/161 |
| 2003/0017014 | A1 * | 1/2003 | Morgulis | B23C 5/109 407/34 |
| 2004/0025969 | A1 * | 2/2004 | Lindsay | B23C 5/207 144/241 |
| 2006/0216121 | A1 * | 9/2006 | Edler | B23B 27/1611 407/104 |
| 2007/0122242 | A1 * | 5/2007 | Englund | B23B 27/1622 407/103 |
| 2007/0160431 | A1 | 7/2007 | Pantzar | |
| 2007/0292220 | A1 * | 12/2007 | Sjoberg | B23B 27/1611 407/66 |
| 2010/0150670 | A1 * | 6/2010 | Hecht | B23C 5/109 407/40 |
| 2011/0236143 | A1 | 9/2011 | Ryu | |
| 2013/0236255 | A1 * | 9/2013 | Hecht | B23B 27/1622 407/103 |
| 2014/0010607 | A1 * | 1/2014 | Wandeback | B23F 21/128 407/113 |
| 2014/0227051 | A1 * | 8/2014 | Hecht | B23B 27/1622 407/103 |
| 2014/0234037 | A1 * | 8/2014 | Horiike | B23C 5/109 407/47 |
| 2015/0336187 | A1 | 11/2015 | Choi et al. | |
| 2016/0067805 | A1 * | 3/2016 | Nickel | B23C 5/207 407/25 |
| 2016/0207124 | A1 * | 7/2016 | Brown | B23C 5/207 |
| 2017/0304911 | A1 * | 10/2017 | Kumoi | B23C 5/109 |
| 2017/0326658 | A1 * | 11/2017 | Oikawa | B23C 5/223 |
| 2018/0036811 | A1 * | 2/2018 | Saji | B23C 5/109 |

OTHER PUBLICATIONS

Written Opinion dated Feb. 9, 2016 issued in counterpart International (PCT) Application (No. PCT/JP2015/083211).

* cited by examiner (a)

(b)

CUTTING INSERT HAVING BOTTOM SURFACE WITH INCLINED PARTS AND INDEXABLE ROTARY CUTTING TOOL

RELATED APPLICATIONS

This is a 371 US National Phase of International Patent Application No. PCT/JP2015/083211 filed Nov. 26, 2015, and published as WO 2016/084891A1 on Jun. 2, 2016, which claims priority to JP 2014-239407, filed Nov. 27, 2014. The contents of the aforementioned applications are incorporated by reference in their entirety.

TECHNICAL FIELD

The present invention relates to a cutting insert and an indexable rotary cutting tool on which such cutting insert is removably mounted.

BACKGROUND ART

As disclosed in Patent Document 1, there has been a cutting insert configured such that, in a side view, a bottom surface thereof is projected outward so as to form a substantially V shape. Such bottom surface consists of a flat base surface and two inclined surfaces on both sides of such base surface. The two inclined surfaces respectively lead to their corresponding side surfaces, each of which extends so as to form an acute angle with an upper surface of the cutting insert. The cutting insert of Patent Document 1 is mounted on a tool body such that the base surface of the V-shaped bottom surface extends in a direction parallel to a rotational axis of the tool body. At this time, the cutting insert is mounted on a mounting seat of the tool body by screwing a mounting screw into a screw hole via a mounting hole which penetrates the upper surface and the bottom surface. Such configuration allows, from among the two inclined surfaces of the bottom surface, an inclined surface located on the outer periphery side of the tool to receive a supporting force from a surface of the mounting seat of the tool body with which such inclined surface comes into contact, and a force applied to the mounting screw is accordingly reduced. This enhances the fixing property with respect to the mounting seat of the cutting insert.

CITATION LIST

Patent Document

Patent Document 1: JP2012-510380 T

SUMMARY

Technical Problem

However, the cutting insert of Patent Document 1 has the problem set forth below. The bottom surface of the cutting insert of Patent Document 1 has a substantially V shape, and thus, an opening of the through hole extends over not only the flat base surface but also the two inclined surfaces located on both sides of such base surface. Therefore, an area where an inner peripheral surface of the through hole and the bottom surface sharply intersect with each other appears. An area, around the through hole, of the bottom surface of the cutting insert is an area where stress is prone to concentrate during, in particular, clamping of the cutting insert, and thus, fracturing is prone to occur in such intersecting area at an acute angle. If the opening of the through hole extends within the flat base surface, the same problem may occur as long as an extremely narrow (thin in thickness) area exists between the inner peripheral surface of the through hole and each inclined surface. A fracture in the area around the through hole may lead to fracturing in the entire cutting insert. Further, due to the bottom surface having a substantially V shape and the side surfaces being inclined so as to constitute a positive type cutting insert, the width of part of the cutting insert, around the mounting hole, is further decreased as such part is more distant from the upper surface in a direction perpendicularly intersecting with the central axis of the mounting hole of the cutting insert. When the width of the cutting insert is reduced around the mounting hole, and when the thickness is therefore thin around the mounting hole in the direction perpendicularly intersecting with the central axis of the mounting hole, the rigidity of the entire cutting insert is lowered, and this easily causes the problem of fracturing, etc., during cutting.

The present invention has been made in light of the above problem, and an object of the present invention is to provide a cutting insert which can improve the fixing property of the cutting insert to a tool body with no loss of rigidity and to provide an indexable rotary cutting tool on which such cutting insert is mounted.

Solution to Problem

The present invention provides a cutting insert 1 comprising a first end surface 2, a second end surface 3 opposing the first end surface 2, and a peripheral side surface 4 connecting the first end surface 2 and the second end surface 3, and having an axis O defined so as to penetrate the first end surface 2 and the second end surface 3, wherein: a mounting hole 5 is formed so as to penetrate the first end surface 2 and the second end surface 3; an intersecting edge between the first end surface 2 and the peripheral side surface 4 is provided with at least a cutting edge 8; the second end surface 3 has at least one inclined part 3a; when a virtual plane P1, which is substantially perpendicular to the axis O and passes through any point of the cutting edge 8, is defined, the inclined part 3a is inclined so as to be more distant from the virtual plane P1, heading from the peripheral side surface 4 to a virtual plane V2, which includes the axis O and extends in a direction substantially parallel to the peripheral side surface 4 which corresponds to the cutting edge 8; and a projected part 5b projected in a direction along the axis O is formed in an area around the mounting hole 5 in the inclined part 3a.

The present invention further provides an indexable rotary cutting tool 11 comprising a tool body 12 which has a rotational axis RA and is provided with at least one insert mounting seat 13, the insert mounting seat 13 having a cutting insert removably mounted thereon, wherein the cutting insert is the above-described cutting insert 1.

Advantageous Effects of Invention

According to the present invention, the area around the opening of the mounting hole formed on the inclined parts of the bottom surface is projected outward from the cutting insert, whereby the interior angle formed by the inclined part and the inner peripheral surface of the mounting hole is large, resulting in greatly enhanced fracture resistance of the part near the intersecting edge between the inclined part and the inner peripheral surface of the mounting hole.

DESCRIPTION OF EMBODIMENTS

Figure 1:
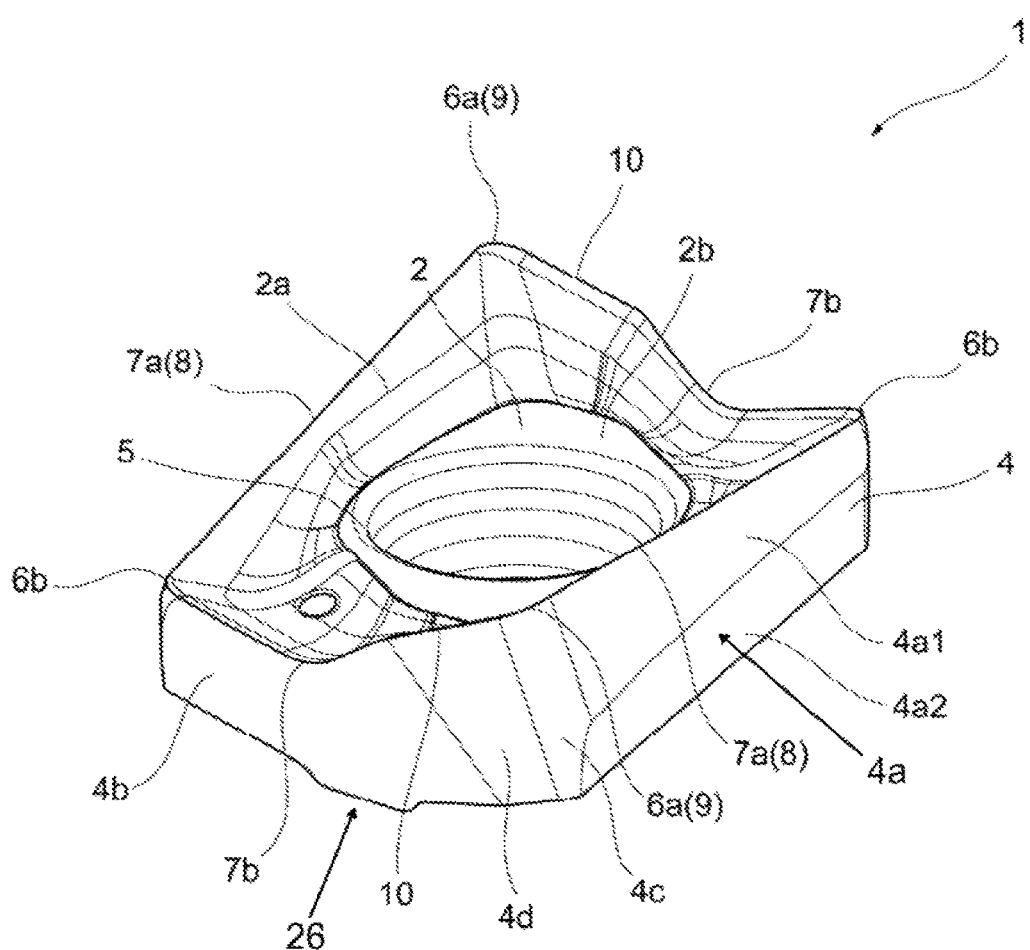
FIG. 1 is a perspective view of an embodiment of a cutting insert according to the present invention.

Embodiments of the present invention will now be described in detail with reference to the attached drawings. Although expressions such as "upper," "lower," "right," "left," "front" and "back" may be used in the following descriptions, such expressions are merely used to aid in easier understanding of the descriptions and are not intended to limit the scope of the present invention.

A cutting insert 1 of the present embodiment has a substantially quadrangular plate shape, as shown in FIGS. 1 to 5, and has a short-side width of approximately 5 mm and a maximum thickness of approximately 3 mm. The cutting insert 1 further has a long-side length of approximately 8 mm, and, out of such length, a major cutting edge 8 occupies a length of approximately 7 mm. The dimensions of the respective parts of the cutting insert 1 are not limited thereto. The cutting insert 1 is basically configured by a first end surface 2 having a substantially quadrangular shape, a second end surface 3 which is arranged so as to oppose the first end surface 2, and a peripheral side surface 4 connecting the first end surface 2 and the second end surface 3. A mounting hole 5 for which a central axis O is defined is provided so as to penetrate substantially a center part of the first end surface 2 and substantially a center part of the second end surface 3. This central axis O is originally a central axis of the cutting insert 1. In the present embodiment, the central axis of the cutting insert 1 matches the central axis of the mounting hole 5, but the configuration is not limited thereto. The cutting insert 1 is configured so as to be of 180-degree rotational symmetry around the central axis O.

As viewed from a direction facing the first end surface 2 (i.e., in FIG. 2), the first end surface 2 forms a substantially quadrangular shape including four curved corners 6 and four sides 7 formed between the corners 6. The four sides 7 are constituted by two long sides 7a and two short sides 7b. The long sides 7a are opposed to each other, and the short sides 7b are also arranged so as to be opposed to each other. Further, the four corners 6 are constituted by two corners which are involved in cutting (hereinafter referred to as cutting corners) 6a and two corners which are not involved in cutting (hereinafter referred to as non-cutting corners) 6b. The cutting corners 6a, which are involved in cutting, and the non-cutting corners 6b, which are not involved in cutting, are alternately arranged with the long sides 7a or the short sides 7b interposed therebetween. Therefore, the cutting insert 1 of the present embodiment has a substantially quadrangular shape of 180-degree rotational symmetry with respect to the central axis O in FIG. 2. However, in the present invention, the shape is not limited thereto, and the cutting insert may have another shape, such as a triangular shape or a pentagonal shape. The peripheral side surface 4 is constituted by a first side surface part 4a which is adjacent to each long side 7a, a second side surface part 4b which is adjacent to each short side 7b, and a third side surface part (corner side surface part) 4c which is adjacent to each corner 6. The shapes and sizes of these surfaces may be changed as appropriate.

An intersecting edge between the first end surface 2 and the peripheral side surface 4 is provided with a plurality of cutting edges. One cutting edge area (or cutting edge section) is constituted by a major cutting edge 8, a corner cutting edge 9 and a minor cutting edge 10. The major cutting edge 8 is formed through an intersecting edge corresponding to the long side 7a (i.e., an intersecting edge between a portion of the first end surface 2 and the first side surface part 4a). In other words, the major cutting edge 8 extends between two corners adjacent to each other, i.e., the cutting corner 6a and the non-cutting corner 6b. The corner cutting edge 9 is formed through an intersecting edge corresponding to the cutting corner 6a (i.e., an intersecting edge between a portion of the first end surface 2 and the third side surface part 4c). One of the ends of the corner cutting edge 9 is connected to one of the ends of the major cutting edge 8. The minor cutting edge 10 is formed in part of an intersecting edge corresponding to the short side 7b (i.e., an intersecting edge between a portion of the first end surface 2 and the second side surface part 4b). In other words, the minor cutting edge 10 is formed between the two adjacent corners, i.e., the cutting corner 6a and the non-cutting corner 6b, so as to cover a position which is separate, by a certain distance, from the cutting corner 6a, in a direction toward the non-cutting corner 6b, and such minor cutting edge 10 is therefore not connected to the non-cutting corner 6b. One of the ends of the minor cutting edge 10 is connected to the end of the corner cutting edge 9 which is different from the end thereof which is connected to the major cutting edge 8. Therefore, in one cutting edge area of the present embodiment, the major cutting edge 8, the corner cutting edge 9 and the minor cutting edge 10 are connected to one another in this order. Further, an inner cutting edge may be formed between the minor cutting edge 10 and the non-cutting corner 6b. An inner cutting edge is a cutting edge used in pocketing, including ramping, etc. The inner cutting edge may be formed such that a part thereof closer to the corner 6a is further inclined outward from the cutting insert 1, as viewed from the direction facing the first end surface 2 (see FIG. 2).

Figure 4:
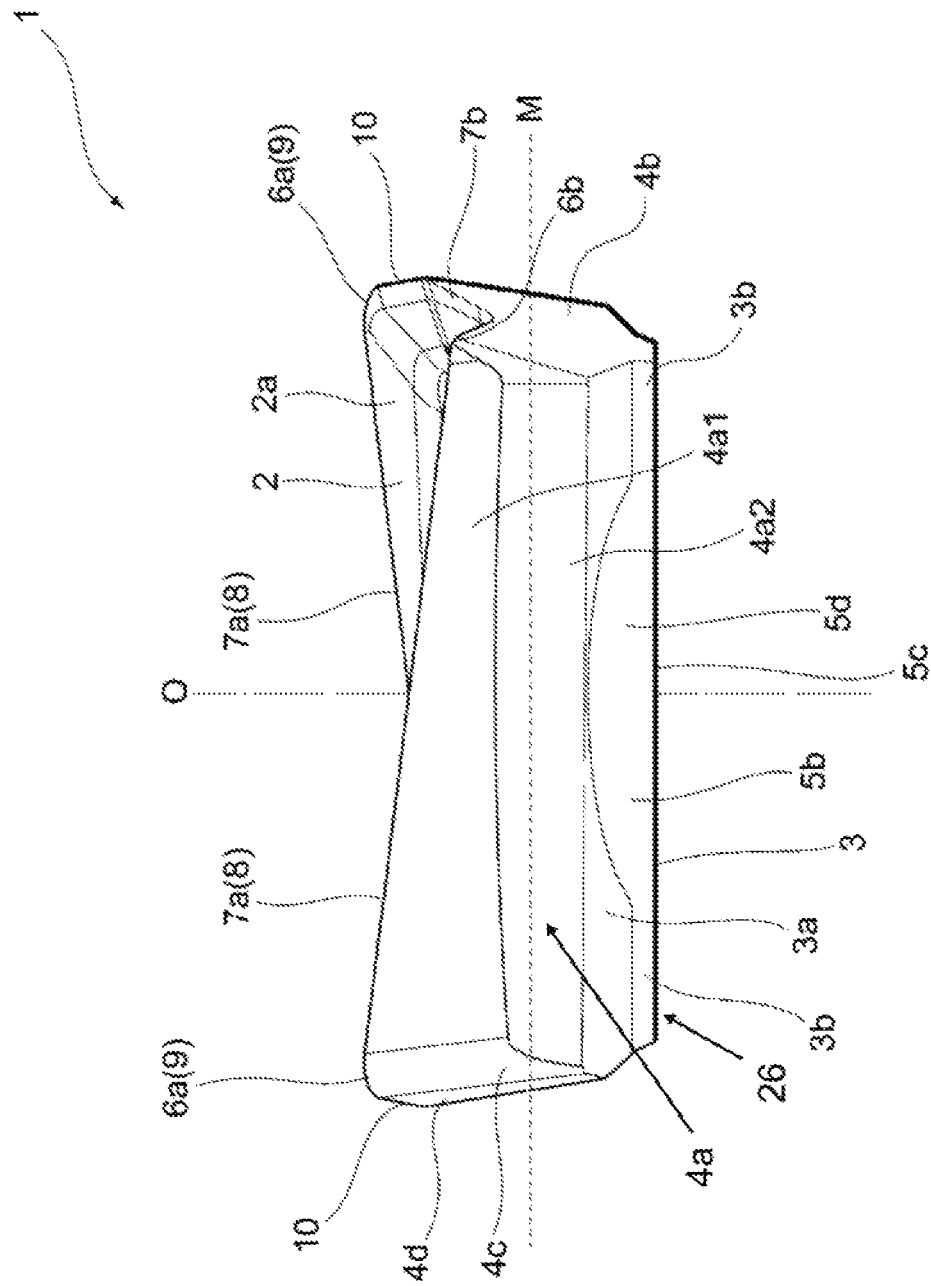
FIG. 4 is a side view of an embodiment of a cutting insert according to the present invention, the view seen from the longer-side direction.
Figure 5:
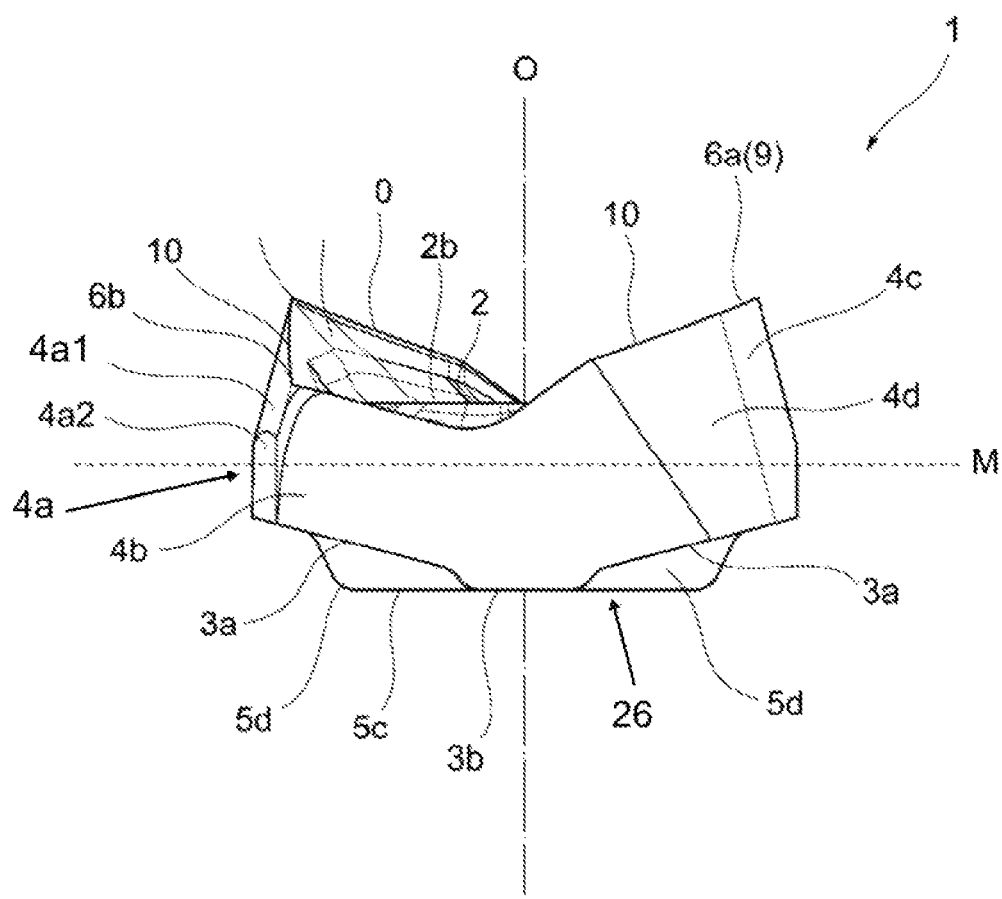
FIG. 5 is a side view of an embodiment of a cutting insert according to the present invention, the view seen from the shorter-side direction.

FIG. 4, being a view in which the cutting insert 1 is viewed from a side facing the first side surface part 4a leading to the major cutting edge 8, and FIG. 5, being a view in which the cutting insert 1 is viewed from a side facing the second side surface part 4b leading to the minor cutting edge 10, are referred to herein. As shown in FIGS. 4 and 5, a plane extending perpendicularly to the central axis O is defined between the first end surface 2 and the second end surface 3, and such plane is defined as an intermediate plane M. Herein, the intermediate plane M extends so as to traverse through the peripheral side surface 4. The major cutting edge 8 is formed such that a distance thereof from the intermediate plane M changes between the two corners, i.e., the cutting corner 6a and the non-cutting corner 6b. More specifically, the major cutting edge 8 linearly extends such that part thereof gradually becomes closer to the second end surface 3 with respect to the first end surface 2 (i.e., closer to the intermediate plane M), heading from the cutting corner 6a to the non-cutting corner 6b. The major cutting edge 10 is also formed such that a distance thereof from the intermediate plane M changes between the two corners, i.e., the cutting corner 6a and the non-cutting corner 6b. More specifically, the minor cutting edge 10 linearly extends such that part thereof gradually becomes closer to the second end surface 3 with respect to the first end surface 2 (i.e., closer to the intermediate plane M), heading from the cutting corner 6a to the non-cutting corner 6b. As described above, it should be noted that the minor cutting edge 10 is formed in part of the short side 7b rather than being formed in the entire short side 7b. The corner cutting edge 9 extends so as to smoothly connect its adjacent major cutting edge 8 and its adjacent minor cutting edge 10. Therefore, the corner cutting edge 9 is located at a furthest distant position from the intermediate plane M with respect to a cutting insert thickness direction being a direction parallel to the central axis O. In the cutting insert 1 of the present embodiment, the respective cutting edges 8, 9, 10 have the above-described shapes. However, the shapes are not limited thereto, and the respective cutting edges 8, 9, 10 may also have other shapes.

The major cutting edge 8 is a cutting edge having a function of mainly cutting a machined side surface of a workpiece. The minor cutting edge 10 is a cutting edge having a function of a machined bottom surface of a workpiece. The corner cutting edge 9 is a cutting edge having a function of cutting a corner located between a machined side surface of a workpiece and a machined bottom surface thereof. The present embodiment employs a cutting insert in which the major cutting edge 8 and the minor cutting edge 10 intersect substantially perpendicularly to each other in a plan view, i.e., a cutting insert of a type which is capable of performing so-called perpendicular shoulder milling. However, the present invention is not limited thereto.

Part of the first end surface 2 functions as a rake surface 2a with regard to the corresponding cutting edges 8, 9, 10. The rake surface 2a is a portion of the first end surface 2 which is adjacent to the respective cutting edges 8, 9, 10, and such rake surface 2a serves as an inclined surface in which part thereof which is more distant from the cutting edges 8, 9, 10 gradually becomes closer to the intermediate plane M. The rake surface 2a is given a positive rake angle. Further, a flat central surface 2b is formed around the mounting hole 5 of the first end surface 2. Part of the peripheral side surface 4 functions as a flank with regard to the corresponding cutting edges 8, 9, 10. More specifically, the first side surface part 4a adjacent to the major cutting edge 8 entirely functions as a flank. As to the second side surface part 4b adjacent to the minor cutting edge 10, not the whole of such second side surface part 4b but only a portion thereof which is directly connected to the minor cutting edge 10 functions as a flank. The third side surface part 4c adjacent to the corner cutting edge 9 entirely functions as a flank.

Figure 6:
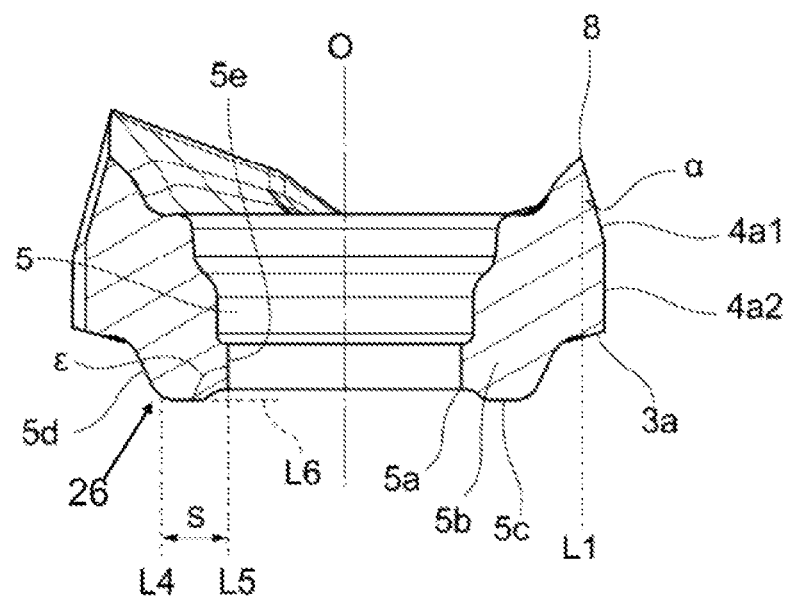
FIG. 6(a) is a cross-sectional view along VI(a)-VI(a) of FIG. 2
FIG. 6(b) is a cross-sectional view along VI(b)-VI(b) of FIG. 2.
Figure 6:
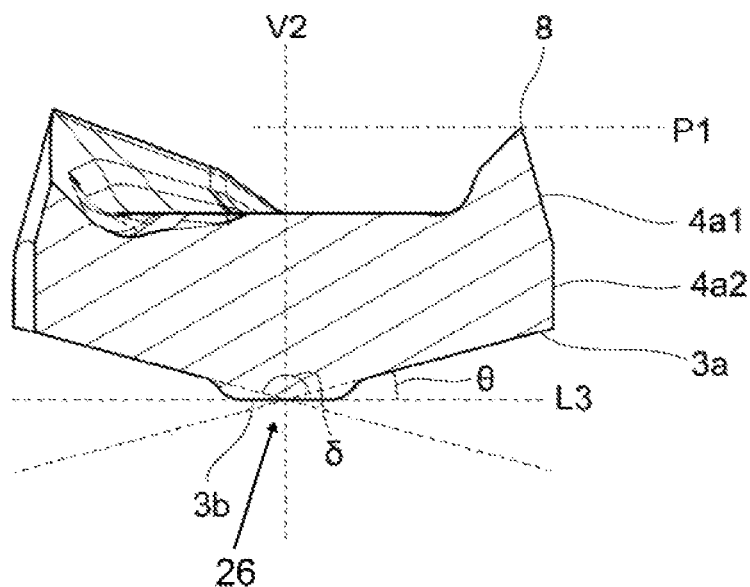

The first side surface part 4a, which functions as the flank of the major cutting edge 8, is configured such that an upper portion 4a1 and a lower portion 4a2 are connected, heading from the first end surface 2 to the second end surface 3. When viewed from a direction facing the second side surface part 4b, the upper portion 4a1 is inclined so as to gradually become more distant from the central axis O, heading from the first end surface 2 to the second end surface 3. This is illustrated in FIG. 6(a). FIG. 6(a) is a cross-sectional view taken along a plane which includes the axis O and is substantially orthogonal to the major cutting edge in FIG. 2. As shown in FIG. 6(a), the upper portion 4a1 is formed such that a clearance angle $\alpha$ thereof is negative. Herein, the clearance angle $\alpha$ refers to an intersection angle between a virtual line L1, which is defined so as to be parallel to the central axis O and is along the major cutting edge 8, and the upper portion 4a1. In FIG. 6(a), an angle when the upper portion 4a1 is located leftward with respect to the vertical line L1 is regarded as being positive. Thus, the upper portion 4a1 can be said to be formed so as to gradually become more distant from the virtual line L1, outward from the cutting insert, heading from the first end surface 2 to the second end surface 3. In the case of the present embodiment, the clearance angle $\alpha$ is −15 degrees. However, the present invention is not limited thereto, and such clearance angle may be changed as appropriate according to the circumstances. Meanwhile, the lower portion 4a2, which is connected to the upper portion 4a1, is configured so as to have a clearance angle of zero degrees. In other words, as shown in FIG. 6(a), the lower portion 4a2 has a positional relationship so as to be parallel to the virtual line L1, as shown in FIG. 6(a). However, the present invention is not limited thereto, and the clearance angle of the lower portion 4a2 may be changed as appropriate.

As described above, in the cutting insert 1 of the present embodiment, the first side surface part 4a is configured such that the upper portion 4a1 and the lower portion 4a2 are connected, heading from the first end surface 2 to the second end surface 3. However, the present invention is not limited to such shape. In other words, the first side surface part 4a may be configured by a single surface or such that three or more surfaces are connected to one another.

Figure 2:
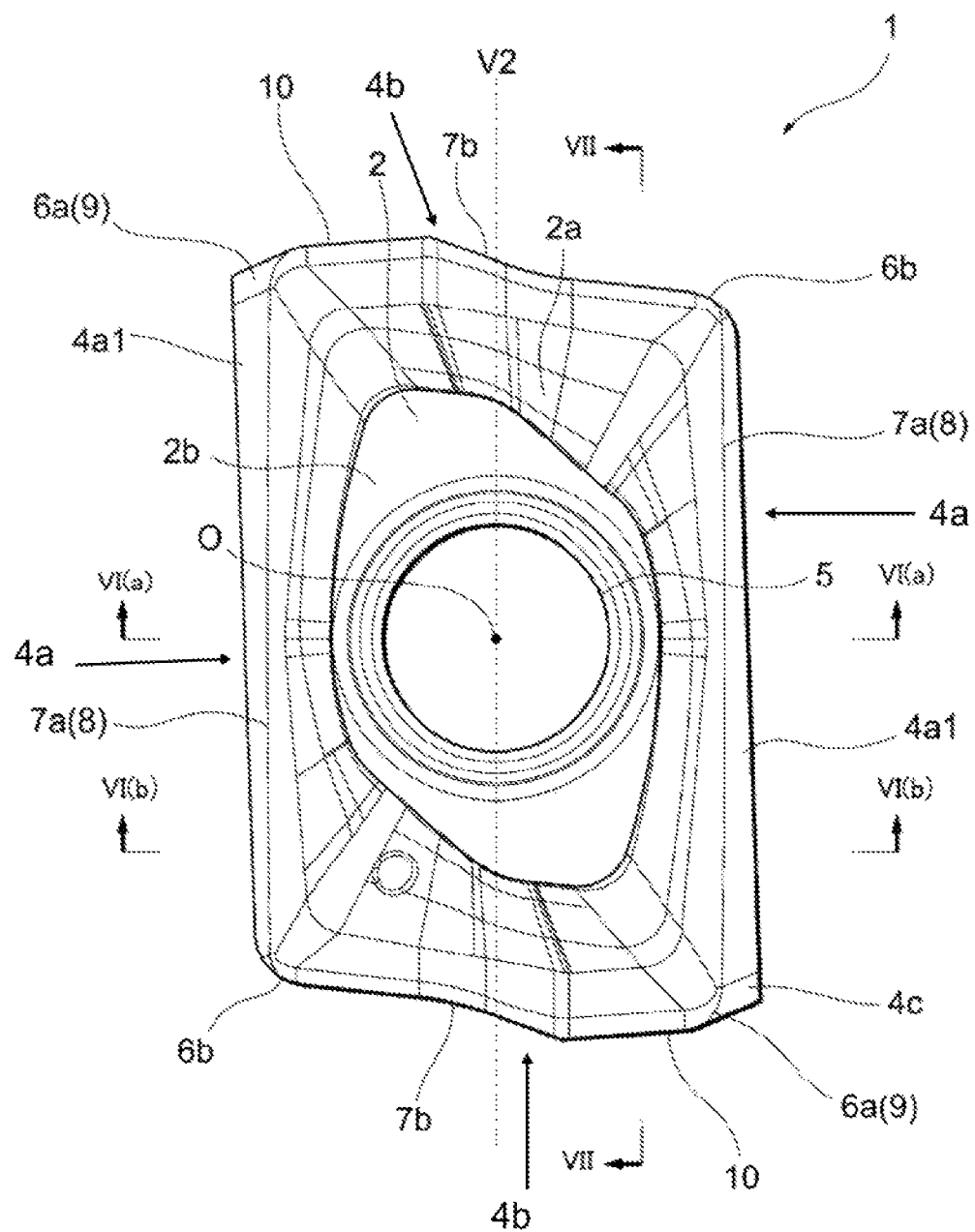
FIG. 2 is a top view of an embodiment of a cutting insert according to the present invention.
Figure 7:
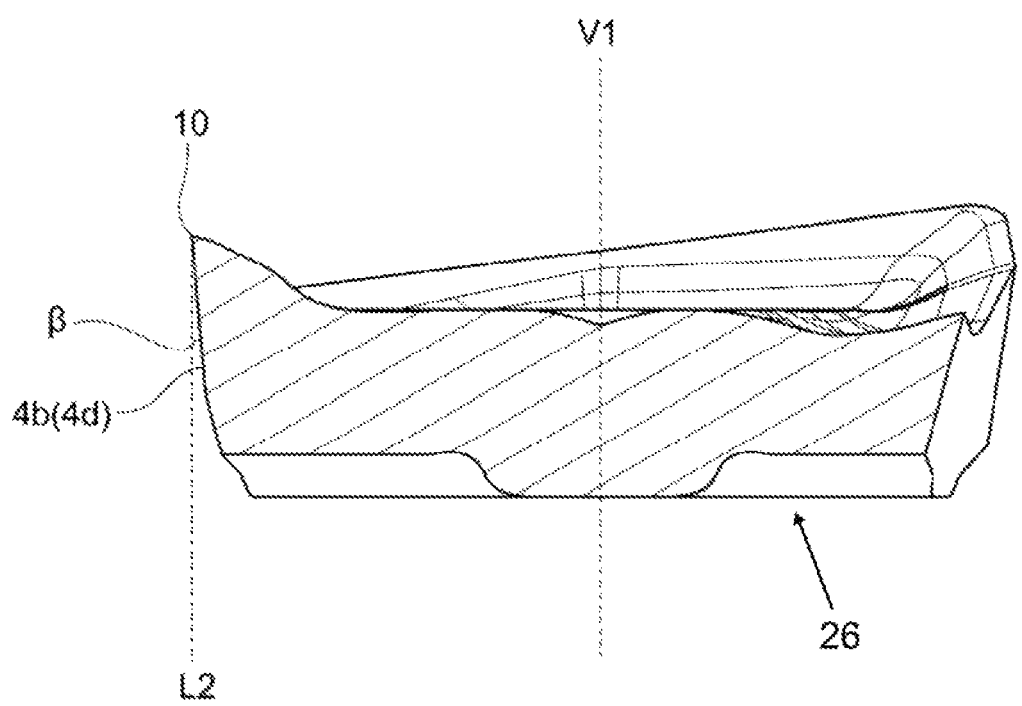
FIG. 7 is a cross-sectional view along VII-VII of FIG. 2.

On the other hand, as shown in FIG. 7, the second side surface part 4b, which has a portion 4d that functions as a flank of the minor cutting edge 10, is inclined so as to gradually become closer to a virtual plane which includes the central axis O and is orthogonal to the VII-VII cross-section in FIG. 2, i.e., a virtual plane V1, which defines a VI(a)-VI(a) cross-section, heading from the first end surface 2 to the second end surface 3. In other words, in the second side surface part 4b, the portion thereof which functions as a flank (more specifically, a portion which is projected outward in FIG. 2) 4d is formed such that a clearance angle $\beta$ thereof is positive. Herein, the clearance angle $\beta$ refers to an intersection angle between a virtual line L2, which is defined so as to be parallel to the central axis O and is along the minor cutting edge 10, and the flank portion 4d of the second side surface part 4b. In FIG. 7, an angle when the flank portion 4d is located rightward with respect to the vertical line L2 is regarded as being positive. Thus, in the second side surface part 4b, the portion 4d, which functions as a flank, can be said to be formed so as to gradually become more distant from the virtual line L2, inward of the cutting insert, heading from the first end surface 2 to the second end surface 3. In the case of the present embodiment, the clearance angle β is 5 degrees. However, the present invention is not limited thereto, and such clearance angle may be changed as appropriate according to the circumstances. Further, the third side surface part 4c, which functions as the flank of the corner cutting edge 9, is formed so as to have a clearance angle which is negative at a portion thereof located on the major cutting edge 8 side and is positive at a portion thereof located on the minor cutting edge 10 side, as can be understood from FIG. 2, etc. In other words, part of the clearance angle of the third side surface part 4c changes gradually. Therefore, the third side surface part 4c smoothly connects the first side surface part 4a and the second side surface part 4b.

Further, a portion of the second side surface part 4b functions as a surface which comes into contact with a side wall surface 14b of an insert mounting seat 13 provided in a tool body 12.

The second end surface 3 ("bottom surface") is configured so as to have a substantially V-shaped cross-section, and is then configured such that part thereof around an opening 5a of the mounting hole 5 is projected. The configuration of the second end surface 3 will be described below in detail. As seen in FIGS. 1, 3, 4, 5, 6(a), 6(b) and 7, the second end surface 3 has a longitudinal rib member 26 connecting the opposing second side surface parts 4b. As shown in FIG. 6(b), the second end surface 3 has two inclined parts 3a, each of which gradually becomes more distant from a virtual plane P1, heading from the first side surface part 4a to a virtual plane V2, which includes the central axis O and is parallel to the VII-VII cross-section in FIG. 2. The virtual plane V2 is a virtual plane which includes the rotational axis O and extends in a direction substantially parallel to the part of the peripheral side surface 4 which corresponds to the major cutting edge 8. In the present embodiment, the virtual plane V2 can also be regarded as a virtual plane which includes the rotational axis O and divides the cutting insert 1 into halves along the longitudinal direction. Herein, FIG. 6(b) is a cross-sectional view taken along a plane parallel to the cross-section of FIG. 6(a). The virtual plane P1 refers to a plane defined so as to be perpendicular to the central axis O and to pass through any point of the major cutting edge 8. Each of the inclined parts 3a is connected to the lower portion 4a2 of the first side surface part 4a. The second end surface 3 has a substantially V shape as viewed from the direction facing the second side surface part 4b (see FIG. 5). A flat part 3b is formed between the two inclined parts 3a so as to connect such inclined parts 3a. However, this flat part 3b is not an essential configuration. When viewed from a direction perpendicular to the central axis O relative to the second side surface part 4b (i.e., in FIG. 6(b)), each inclined part 3a has an inclination angle θ of 15 degrees, i.e., the two inclined parts 3a share the same angle. Herein, the inclination angle θ refers to an intersection angle between a virtual line L3, which is perpendicular to the central axis O and passes through an intersection between extension planes of the two inclined parts 3a, and the inclined part 3a, and in FIG. 6(b), an angle when the inclined part 3a is located above the vertical line L3 is regarded as being positive. In the present embodiment, an interior angle δ, which is formed by the extension planes of the two inclined parts 3a, is 150 degrees. Further, the second end surface 3 functions as a seating surface which comes into contact with a bottom wall surface 14a of the insert mounting seat 13 provided in the tool body 12. However, the configuration is such that, in practice, only the two inclined parts 3a come into contact with the bottom wall surface 14a and that the flat part 3b does not come into contact with the bottom wall surface 14a.

Figure 3:
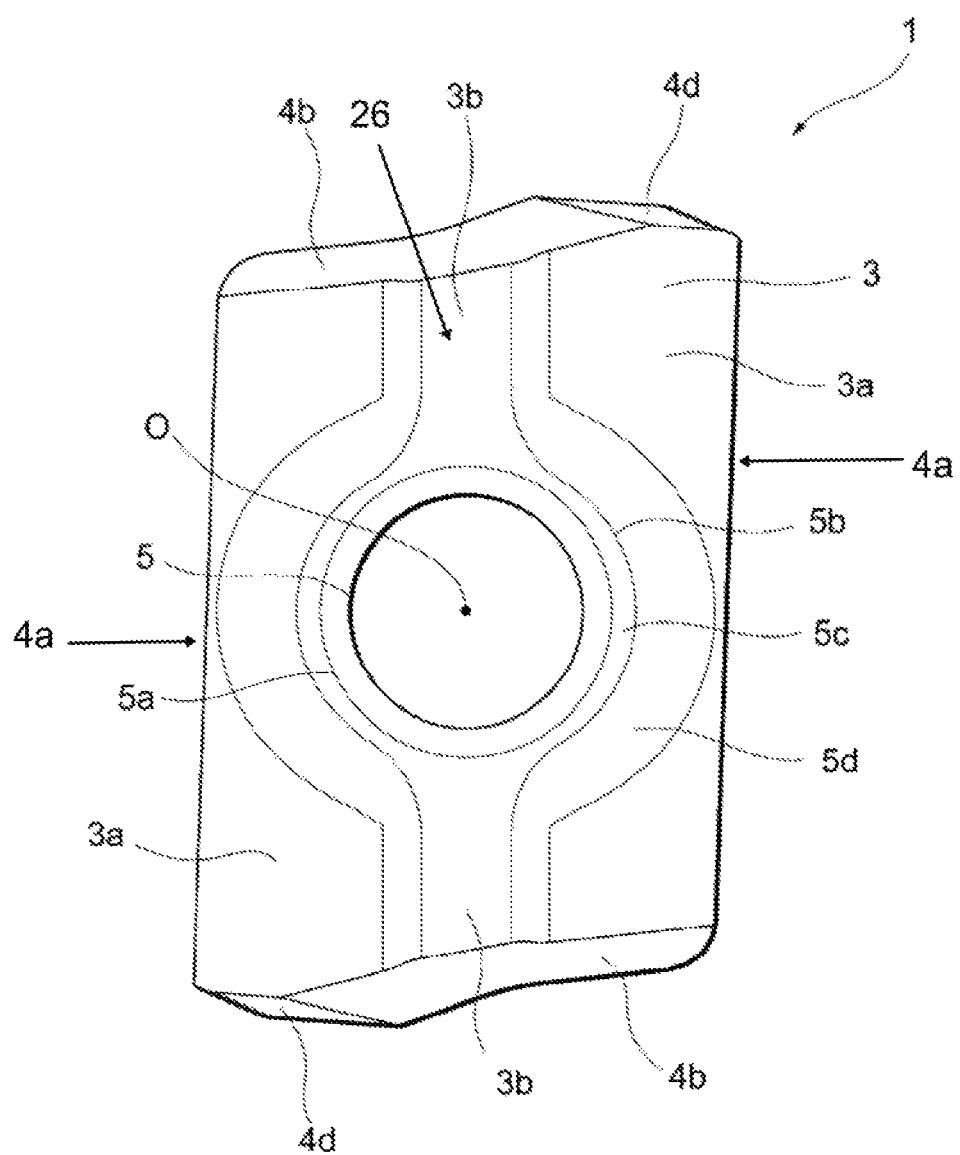
FIG. 3 is a bottom view of an embodiment of a cutting insert according to the present invention.

In the cutting insert 1 of the present embodiment, as shown in FIGS. 3, 4, 5 and 6(a), the opening 5a, on the second end surface 3 side, of the mounting hole 5 has a shape which is projected, from the inclined part 3a, outward from the cutting insert. In other words, the area around the mounting hole 5 which includes the opening 5a is configured as a projected part 5b projected outward from the cutting insert, in a direction along the central axis O. An end surface 5c of the projected part 5b is configured by a flat surface and extends substantially perpendicularly to the central axis O. In the present embodiment, the projected part 5b is configured integrally with the flat part 3b. Therefore, as can be understood from FIG. 5, the end surface 5c of the projected part 5b and the flat part 3b are configured to be located on a single plane. However, the shape of the projected part 5b is not limited to such shape, and the projected part 5b and the flat part 3b may be formed separately. As seen in the figures, the longitudinal rib member 26 comprises the projected part 5b which is formed around and encircles the mounting hole 5, while the inclined parts 3a merge with the longitudinal rib member 26. And as best seen in FIG. 3, the longitudinal rib member 26 is widest at the projected part 3b, along a direction between the first side surface parts 4a which passes through the rotation axis O. Furthermore, the inclined parts 3a extend along a length of the longitudinal rib member 26 which includes the projected part 5b.

Further, as shown in FIG. 6(a), in the cross-section cut along a plane which passes through the central axis O and is parallel to the central axis O (i.e., a plane including the central axis O), a distance S between a virtual line L4, which passes through an intersection between the end surface 5c of the projected part 5b and the side surface 5d thereof and is parallel to the central axis O, and a virtual line L5, which is along the inner peripheral surface 5e of the mounting hole 5, is preferably from 0.5 mm to 1.5 mm through the mounting hole 5. Moreover, as shown in FIG. 6(a), an interior angle ε, which is formed by a virtual line L6 of the end surface 5c of the projected part 5b and the virtual line L5 along the inner peripheral surface 5e of the mounting hole 5 is preferably 85 degrees or more through the mounting hole 5.

Figure 8:
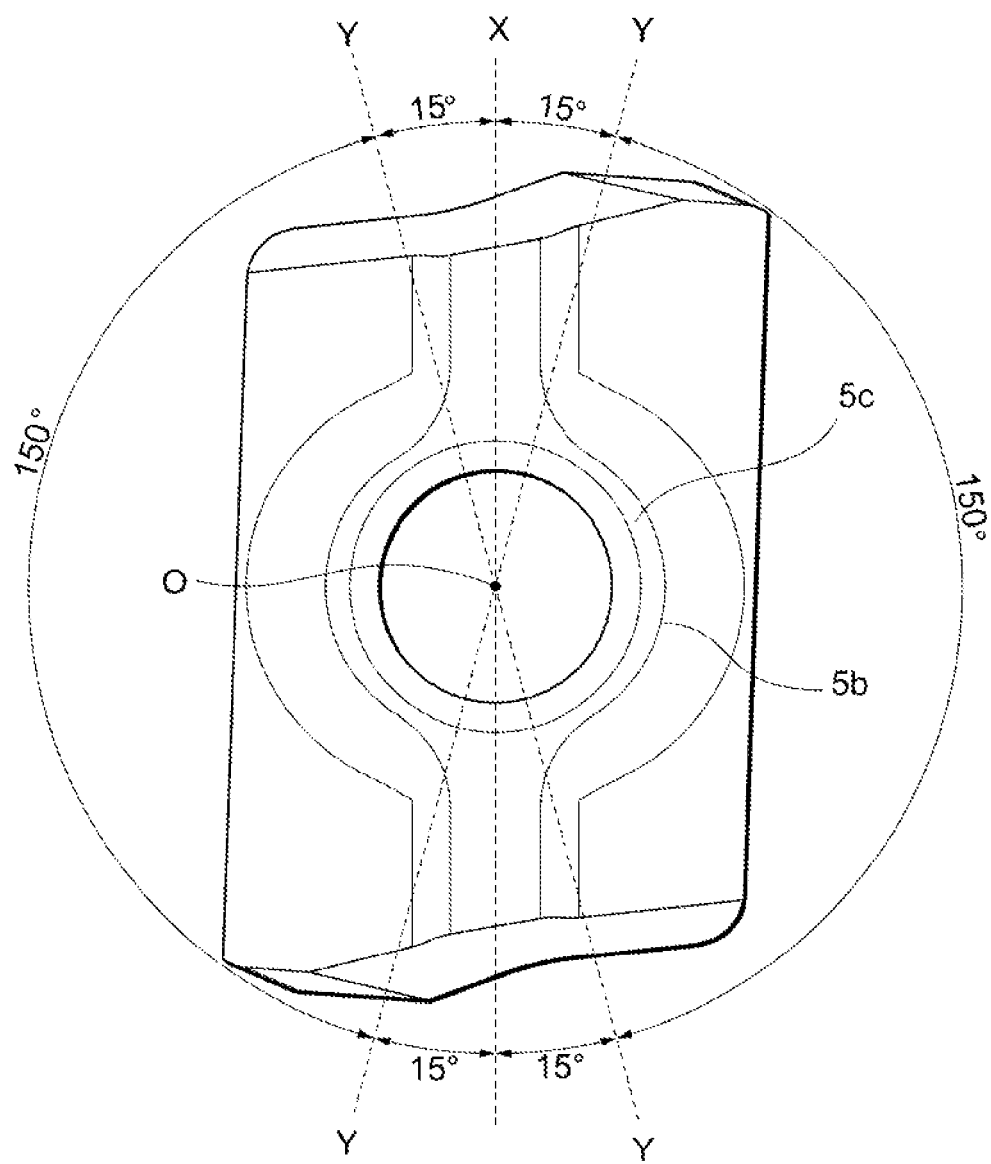
FIG. 8 is an explanatory view of part around a projected part viewed from a direction facing a second end surface.
Figure 9:
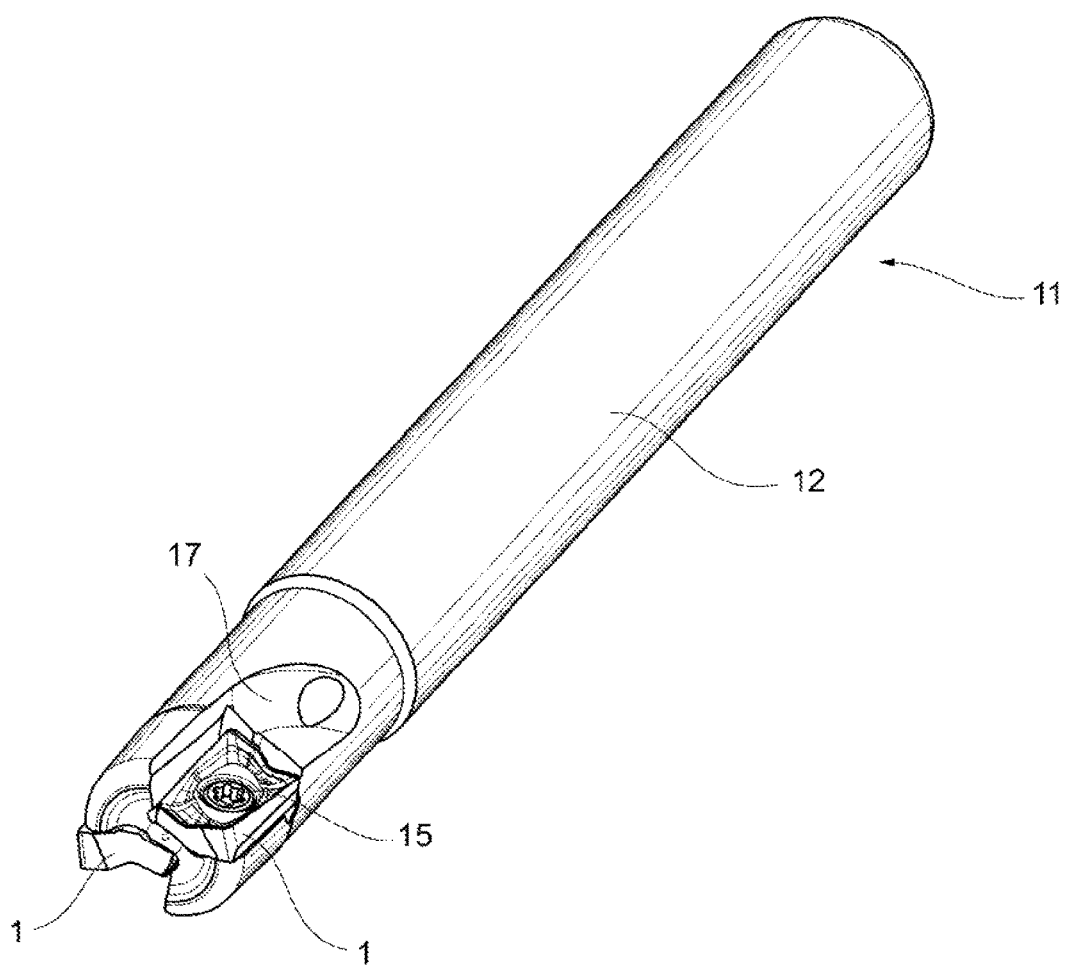
FIG. 9 is a perspective view of an embodiment of an indexable rotary cutting tool according to the present invention.
Figure 10:
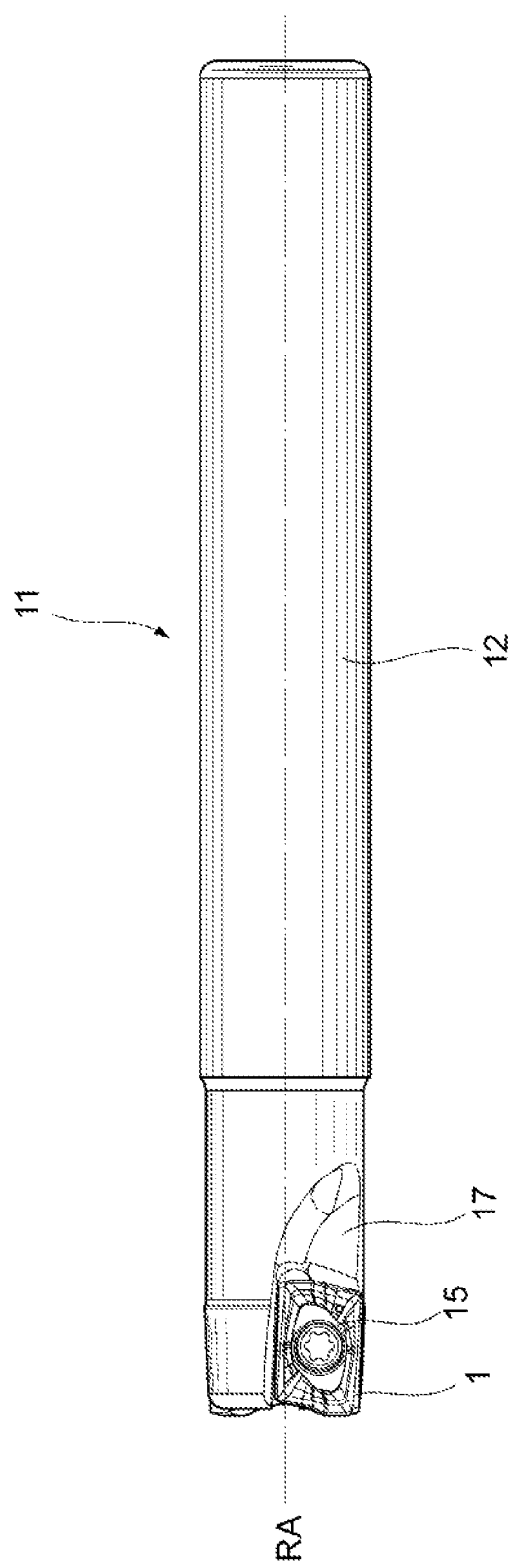
FIG. 10 is a side view of an embodiment of an indexable rotary cutting tool according to the present invention.
Figure 11:
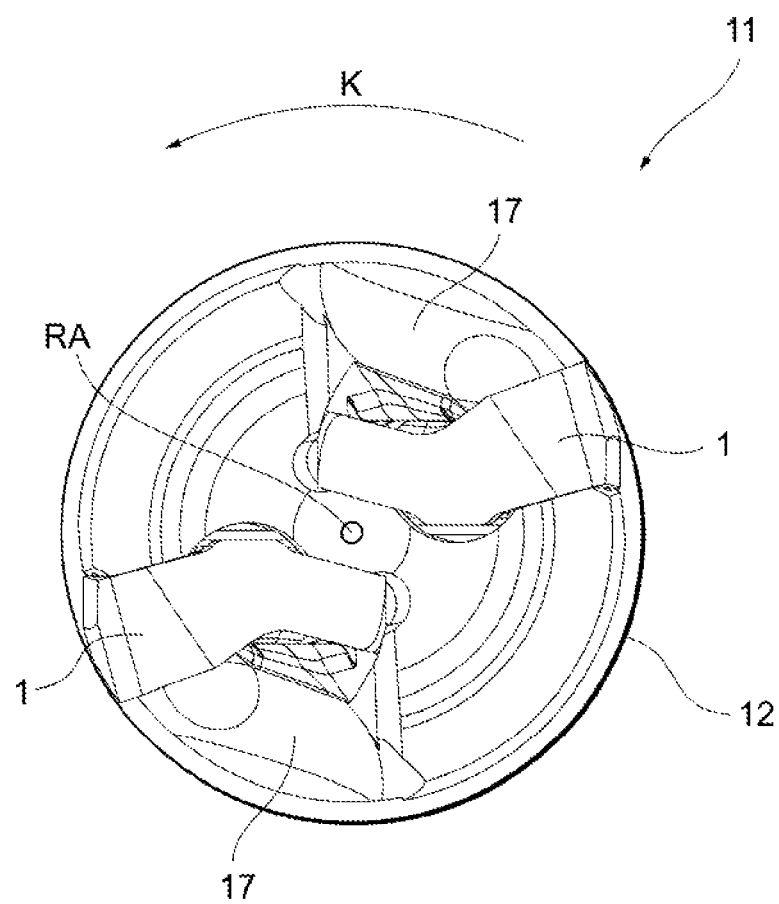
FIG. 11 is an end view of an indexable rotary cutting tool according to an embodiment of the present invention.
Figure 12:
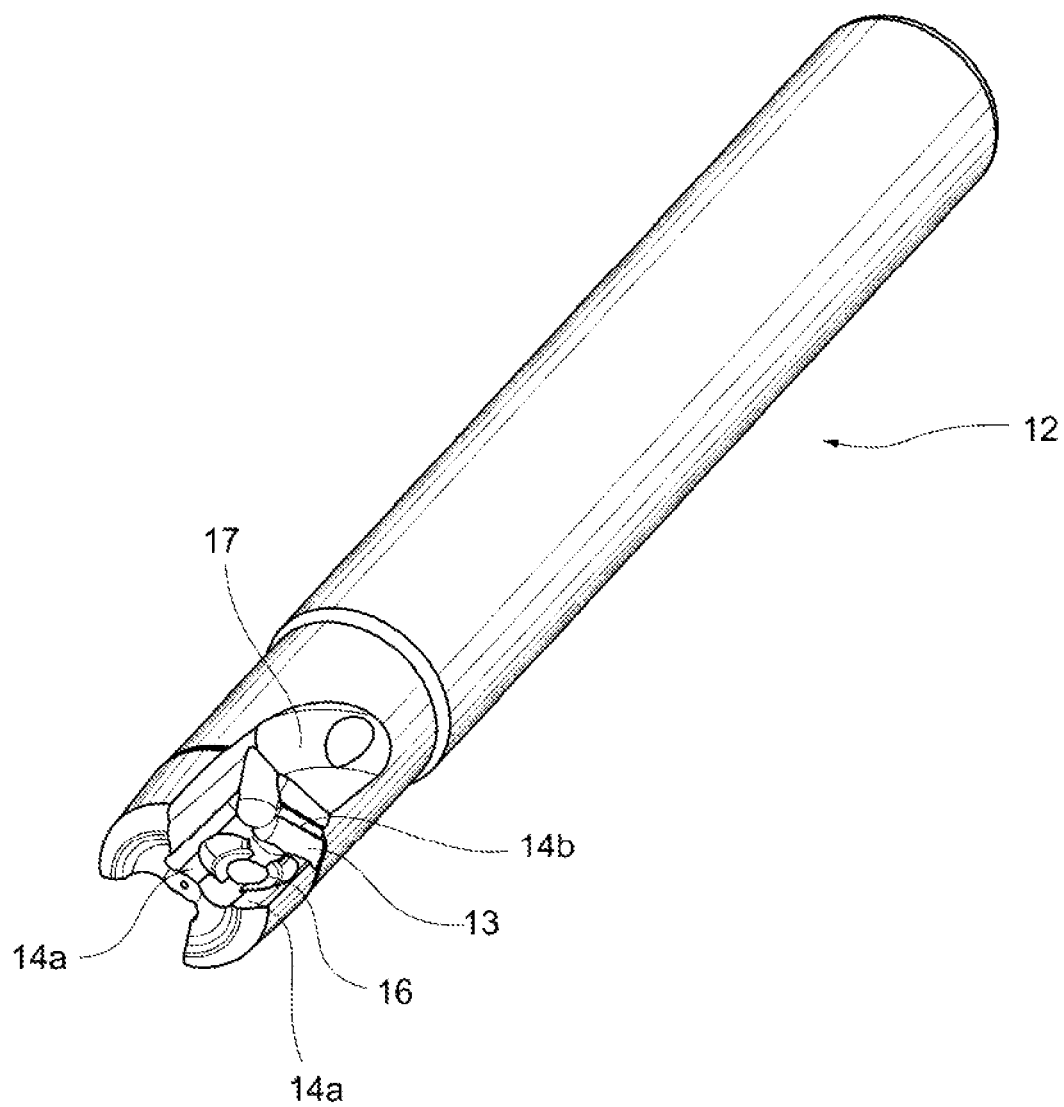
FIG. 12 is a perspective view of an embodiment of a tool body.
Figure 13:
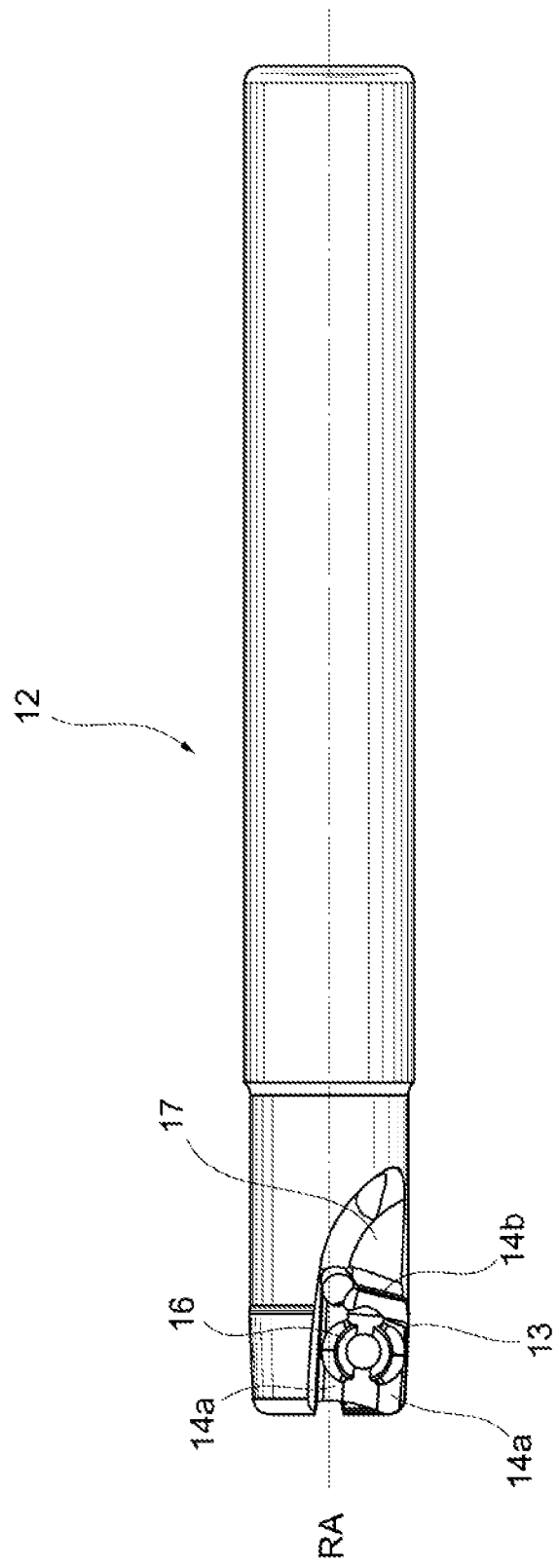
FIG. 13 is a perspective view of an embodiment of a tool body.
Figure 14:
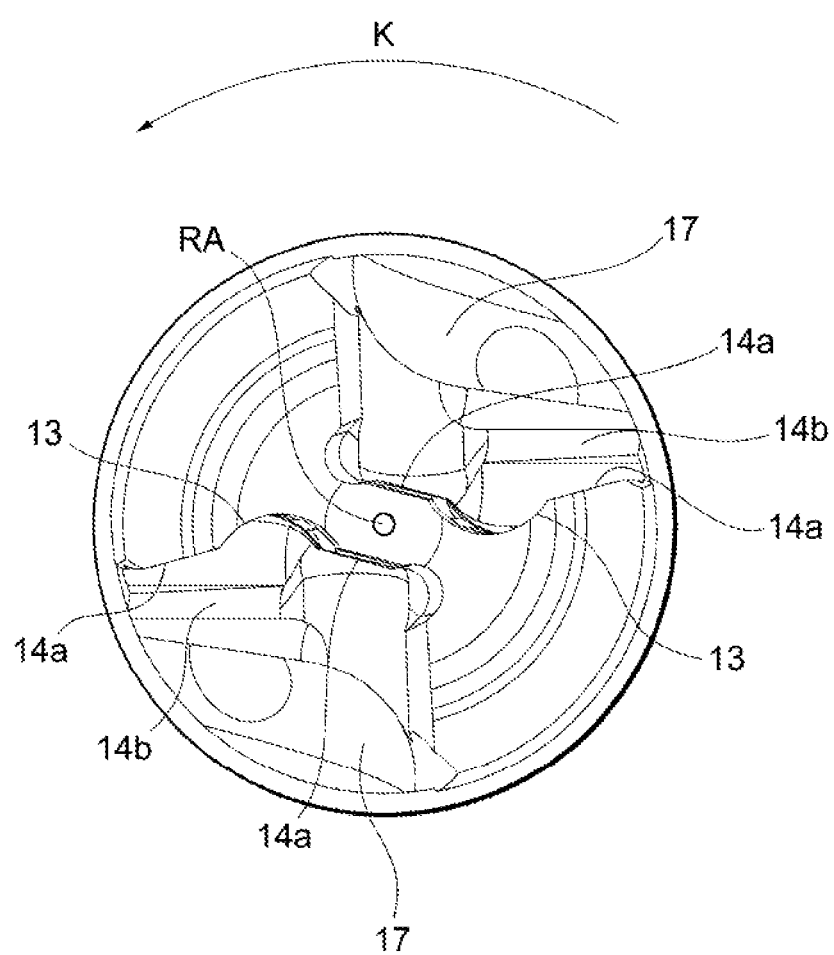
FIG. 14 is an end view of an embodiment of a tool body.

Furthermore, as shown in FIG. 6(b), the extension planes of the two inclined parts 3a intersect with each other on the central axis O, and as shown in FIG. 8 (same as FIG. 3), when the cutting insert 1 is viewed from a direction facing the second end surface 3, the intersecting line X between the extension planes of the two inclined parts 3a is defined as a line extending in the longitudinal direction of the cutting insert 1. In addition, as shown in FIG. 8, a reference line Y is defined at a position obtained through rotation around the central axis O by approximately 15 degrees with respect to the intersecting line X. Such reference line Y is defined, in all directions around the central axis X, with respect to the intersecting line X. Thus, four reference lines Y are defined radially around the central axis O. As to each of the two inclined parts 3a, the projected part 5b of the present embodiment extends between the two reference lines Y. In other words, as to each of the two inclined parts 3a, the end surface 5c of the projected part 5b is continuously formed without interruption over a 150-degree area between the two reference lines Y. The present embodiment is not limited to such configuration, but the projected part 5b preferably exists over at least such area.

The cutting insert 1 can be made of hard materials, such as cemented carbide, cermet, ceramic, or an ultrahighpressure sintered body containing mono-crystalline diamond, diamond or cubic boron nitride, or a material obtained by applying PVD or CVD coating to these materials.

Next, an indexable rotary cutting tool 11 on which the cutting insert 1 of the above embodiment is removably mounted will be described with reference to FIGS. 9 to 14.

The indexable rotary cutting tool 11 of the present embodiment comprises the tool body 12. The tool body 12 has a rotational axis RA which is defined so as to extend from its leading end to its base end. Herein, the leading end refers to an end of the tool body 12 on which the cutting insert 1 is mounted while the base end refers to an end located on the opposite side. The indexable rotary cutting tool 11 is configured so as to be capable of being rotated forward, around the rotational axis RA, in a rotating direction K.

The tool body 12 has, as its entire shape, a substantially cylindrical shape which extends along the rotational axis RA. The leading end of the tool body 12 is provided with a plurality of insert mounting seats 13. Although two insert mounting seats 13 are formed in the present embodiment, the number of the insert mounting seats 13 may be one or three or higher. Each insert mounting seat 13 is formed so as to be opened forward in the rotating direction K around the rotational axis RA and to be opened toward the leading end and toward the outer periphery.

The insert mounting seat 13 comprises the bottom wall surface 14a which is capable of coming into contact with the inclined part 3a of the second end surface 3 of the cutting insert 1 and the side wall surface 14b which is capable of coming into contact with a portion of the second side surface part 4b which excludes the third side surface part 4c in the cutting insert 1. The bottom wall surface 14a comprises two divided surface portions, which are configured so as to respectively come into contact with the two inclined parts 3a of the cutting insert 1. Therefore, an angle formed by extension planes of the two divided surface portions of the bottom wall surface 14a is substantially equal to the angle ε formed by the extension planes of the two inclined parts 3 of the cutting insert 1. A recessed part (i.e., a circular-arc-shaped recess) is provided between such two portions of the bottom wall surface 14a. Each portion of the bottom wall surface 14a basically has a shape equal or corresponding to the inclined part 3a of the cutting insert 1 and has a size corresponding to the inclined part 3a. The bottom wall surface 14a faces forward in the rotating direction K. A screw hole 16 into which the fastening screw 15 for fixing the cutting insert 1 is to be inserted is formed substantially at a center of the bottom wall surface 14a. The side wall surface 14b faces in a direction of the leading end of the tool and has a shape and size which allow the side surface wall 14b to come into contact with the flat surface of the second side surface part 4b of the cutting insert 1.

Further, a chip pocket 17 for discharging chips produced through cutting is provided forward of each insert mounting seat 13 in the tool rotating direction K.

The cutting insert 1 is mounted on such insert mounting seat 13 by screwing the fastening screw 15 into the screw hole 16 via the mounting hole 5. At this time, the flat part 3a and the projected part 5b of the cutting insert 1 are not in contact with the insert mounting seat 13.

Next, the operation and effects of the cutting insert 1 and the indexable rotary cutting tool 11 of the present embodiments will be described below.

In the cutting insert 1 of the present embodiment, the inclined part 3a is inclined so as to be more distant from the virtual plane P1, heading from the peripheral side surface 4 to the virtual plane V2, which includes the rotational axis O and extends in the direction substantially parallel to part of the peripheral side surface 4 which corresponds to the major cutting edge 8. Further, the projected part 5b which is projected, in the direction along the central axis O, outward from the cutting insert is formed in an area around the mounting hole 5 in the inclined part 3a. Thus, the following effects can be obtained. More specifically, since the provision of the projected part 5b does not produce an area where the inner peripheral surface 5e of the mounting hole 5 and the inclined part 3a sharply intersect with each other or an area where the space between such components is narrow (the width is very thin), the strength around the mounting hole 5, on the second end surface 3 side, of the cutting insert 1 is greatly enhanced compared with the prior art. Therefore, it is possible to obtain the effect of significantly suppressing damage around the mounting hole 5 where stress is prone to concentrate during clamping of the cutting insert 1. In addition, it is possible to obtain the effect of enhancing the rigidity of the entire cutting insert 1 by having the thickness around the mounting hole 5 able to be increased in a direction which perpendicularly intersects with the central axis O of the cutting insert 1.

In the cross-section (FIG. 6(a)) cut along the plane which passes through the central axis O and is parallel to the central axis O (i.e., the plane including the central axis O), the distance S between the virtual line L4, which passes through the intersecting area between the end surface 5c of the projected part 5b and the side surface 5d thereof and is parallel to the central axis O, and the virtual line L5, which is along the inner peripheral surface 5e of the mounting hole 5, is preferably from 0.5 mm to 1.5 mm. When the distance S is less than 0.5 mm, the width of the projected part 5b is too narrow, and this reduces the effect of enhancing the rigidity of the cutting insert 1. Meanwhile, when the distance S is more than 1.5 mm, the projected part 5b is too wide relative to the inclined part 3a. Since the inclined part 3a functions as a seating surface, the projected part 5b reduces the seating area, and this may impair seating stability.

Further, in the cross-section cut along the plane which passes through the central axis O and is parallel to the central axis O (i.e., the plane including the central axis O), the interior angle ε, which is formed by the virtual line L6 of the end surface 5c of the projected part 5b and the virtual line L5 along the inner peripheral surface 5e of the mounting hole 5, is preferably 85 degrees or more. When this interior angle ε is less than 85 degrees, the edge of the opening 5a of the mounting hole 5 forms an extremely acute angle, and this may reduce the effect of suppressing fracturing. The interior angle ε is more preferably 90 degrees or more. This is because, when the interior angle ε is a right angle or an obtuse angle, the strength of the opening 5a area of the mounting hole 5 is significantly increased.

Although, in the present embodiment, the second end surface 3 has, as its main configuration, a substantially V shape in which the two inclined parts 3a intersect with each other, the present invention is not limited thereto, and the effect can be exerted even when the second end surface 3 is configured so as to have one or three or more inclined surfaces 3a. However, the present invention is particularly effective when the second end surface 3 has a V shape because such shape remarkably reduces the thickness around the mounting hole 5, resulting in the problem of poor strength of the cutting insert 1. Further, the inclined part 3a may be a curved surface rather than a flat surface or may be constituted by a flat surface and a curved surface. The number of the cutting edge sections 8, 9, 10 formed in the intersecting edge between the first end surface 2 and the peripheral side surface 4 may be n (where n is an integer of 1 or higher). In the present embodiment, each of the first end surface 2 and the second end surface 3 is formed in a shape of 2-fold rotational symmetry around the central axis O, meaning that two cutting edge sections 8, 9, 10 are provided.

As to the projected part 5b, it is preferable that, when the cutting insert 1 is viewed from the direction facing the second end surface 3, the intersecting line X between the extension planes of the two inclined parts 3a passes through the central axis O, and it is also preferable that, when the plurality of reference lines Y is defined at positions obtained via rotation around the central axis O by approximately 15 degrees with respect to the intersecting line X, the end surface 5c of the projected part 5b extends over a 150-degree area between the reference lines Y, in each of the two inclined parts 3a. In other words, it is preferable for the projected part 5b to be continuously formed without interruption over a 150-degree area between the two reference lines Y in each of the two inclined parts 3a. The provision of the projected part 5b in such range ensures, over a wide range, a sufficient thickness, around the mounting hole 5, of the cutting insert 1, and this greatly enhances the rigidity of the cutting insert 1. When the reference line Y is defined at an angle of more than 15 degrees with respect to the intersecting line X (i.e., when the angle between the reference lines Y is less than 150 degrees), although the projected part 5b extends over a narrower range, the effects of the present invention can still be achieved to some degree. However, the above numerical range can achieve greater effects.

The clearance angle of the side surface part (the first side surface part 4a in the present embodiment) adjacent to the inclined part 3 is preferably negative. This can increase the width around the mounting hole 5 in the area near the second end surface 3 while the second end surface 3 has a V shape, and therefore, the effect of enhancing the rigidity of the cutting insert 1 is further improved.

Although representative embodiments of the present invention have been described above, various modifications may be made to the present invention, and any replacements and modifications thereof may be made without departing from the spirit and scope of the invention defined in the scope of the claims of the present application.

REFERENCE SIGNS LIST

1 Cutting tool
2 First end surface
2a Rake surface
2b Central plane
3 Second end surface
3a Inclined part
3b Flat part
4 Peripheral side surface
4a First side surface part
4a1 Upper portion
4a2 Lower portion
4b Second side surface part
4c Third side surface part
4d Portion of the second side surface part which functions as a flank
5 Mounting hole
5a Opening on the second side surface side
5b Projected part
5c End surface of the projected part
5d Side surface of the projected part
5e Inner peripheral surface of the mounting hole
6 Corner
6a Corner involved in cutting (cutting corner)
6b Corner not involved in cutting (non-cutting corner)
7 Side
7a Long side
7b Short side
8 Major cutting edge
9 Corner cutting edge
10 Minor cutting edge
11 Indexable rotary cutting tool
12 Tool body
13 Insert mounting seat
14a Bottom wall surface
14b Side wall surface
15 Fastening screw
16 Screw hole
17 Chip pocket

What is claimed is:

1. A cutting insert (1) comprising a first end surface (2), a second end surface (3) opposing the first end surface (2), and a peripheral side surface (4) connecting the first end surface (2) and the second end surface (3), and having an axis (O) defined so as to penetrate the first end surface (2) and the second end surface (3), wherein:
   a mounting hole (5) is formed so as to penetrate the first end surface (2) and the second end surface (3);
   an intersecting edge between the first end surface (2) and the peripheral side surface (4) is provided with at least a cutting edge (8);
   the second end surface (3) has at least one inclined part (3a);
   when a virtual plane (P1) which is substantially perpendicular to the axis (O) and passes through any point of the cutting edge (8) is defined, the inclined part (3a) is inclined so as to be more distant from the virtual plane (P1), heading from the peripheral side surface (4) to a virtual plane (V2), which includes the axis (O) and extends in a direction substantially parallel to the peripheral side surface (4) which corresponds to the cutting edge (8); and
   a projected part (5b) projected in a direction along the axis (O) is formed between the mounting hole (5) and the inclined part (3a),
   wherein the projected part (5b) is directly connected to the inclined part (3a).

2. The cutting insert (1) according to claim 1, wherein, in a cross-section cut along a plane including the axis (O), a distance (S) between a virtual line (L4), which passes through an intersecting area between an end surface (5c) of the projected part (5b) and a side surface (5d) thereof and is parallel to the axis (O), and a virtual line (L5), which is along an inner peripheral surface (5e) of the mounting hole (5), is from 0.5 mm to 1.5 mm or less through the mounting hole (5).

3. The cutting insert (1) according to claim 2, wherein, in the cross-section cut along the plane including the axis (O), an interior angle (c), which is formed by a virtual line (L6) of the end surface (5c) of the projected part (5b), and the virtual line (L5) along the inner peripheral surface (5e) of the mounting hole (5), is 85 degrees or more.

4. The cutting insert (1) according to claim 3, wherein the interior angle (c) is 90 degrees or more.

5. The cutting insert (1) according to claim 1, wherein:
   the two inclined parts (3a) are provided on the second end surface (3); and the two inclined parts (3a) are arranged such that a cross-section of the second end surface (3) has a substantially V shape which is projected outward from the cutting insert.

6. The cutting insert (1) according to claim 5, wherein:

when the cutting insert (1) is viewed from a direction facing the second end surface (3), an intersecting line (X) between extension planes of the two inclined parts (3a) passes through the axis (O); and when at least two reference lines (Y) are defined at positions obtained via rotation around the axis (O) by approximately 15 degrees with respect to the intersecting (X), the end surface (5c) of the projected part (5b) extends over a 150-degree area sandwiched between the two reference lines (Y).

7. The cutting insert (1) according to claim 1, wherein:

part of the peripheral side surface (4) functions as a flank; and a flank portion of the peripheral side surface (4) which is adjacent to the inclined part (3a) is formed so as to have a negative clearance angle.

8. The cutting insert (1) according to claim 1, wherein the inclined part (3a) extends along a portion of the peripheral side surface (4) which is adjacent to the cutting edge (8).

9. The cutting insert (1) according to claim 8, wherein:

the intersecting edge between the first end surface (2) and the peripheral side surface (4) is provided with a number n cutting edge sections (8, 9, 10), n being an integer of 1 or higher; and each of the first end surface (2) and the second end surface (3) is formed in a shape of 2-fold rotational symmetry around the axis (O).

10. An indexable rotary cutting tool (11) comprising:

a tool body (12) which has a rotational axis (RA) and is provided with at least one insert mounting seat (13), the insert mounting seat (13) having a cutting insert removably mounted thereon, wherein the cutting insert is the cutting insert (1) according to claim 1.

11. The cutting insert (1) according to claim 1, wherein:

the projected part (5b) is formed around and encircles the mounting hole (5).

\* \* \* \* \*